US006477552B1

(12) United States Patent
Ott

(10) Patent No.: US 6,477,552 B1
(45) Date of Patent: Nov. 5, 2002

(54) DEVICE AND METHOD FOR PERFORMING A LEADING ZERO DETERMINATION ON AN OPERAND

(75) Inventor: Michael L. Ott, Walnut Creek, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/443,225

(22) Filed: Nov. 18, 1999

(51) Int. Cl.[7] .................................................. G06F 7/00
(52) U.S. Cl. ...................................................... 708/211
(58) Field of Search ................................. 708/211, 200

(56) References Cited

U.S. PATENT DOCUMENTS

| | | | |
|---|---|---|---|
| 5,568,410 A | * 10/1996 | Béchade ...................... | 708/211 |
| 5,657,260 A | * 8/1997 | Makino ....................... | 708/211 |
| 5,798,953 A | 8/1998 | Lozano ....................... | 364/715.1 |
| 5,844,826 A | * 12/1998 | Nguyen ....................... | 708/211 |

OTHER PUBLICATIONS

"Structred 64–BIT Leading Zero Encoder" IBM Technical Disclosure Belletin, US, IBM Corp. New York, vol. 31, No. 12, May 1989, pp. 452–454.

* cited by examiner

Primary Examiner—Tan V. Mai
(74) Attorney, Agent, or Firm—Gunnison, McKay & Hodgson, L.L.P.; Philip J. McKay

(57) ABSTRACT

A device for performing a consecutive clear bits count on an operand with an offset includes a plurality of logic circuits, each associated with a prioritized portion of the operand. Each logic circuit activates an all-zero signal when its respective portion of the operand consists of all zeros, performs a leading zero count on its respective portion of the operand, and generates a leading zero signal by offsetting its leading zero count with a first portion of the offset. Also, a priority encoder generates a signal encoding the priority of the highest priority inactive all-zero signal, and muxes select first and second portions of the leading zero signal associated with the highest priority inactive all-zero signal as a first portion of the consecutive clear bits count and a carryout selector signal, respectively, in accordance with the priority encoded signal. Further, adders generate a no-carryout signal by offsetting the priority encoded signal with a second portion of the offset, and generate a carryout signal by offsetting the priority encoded signal with the second portion of the offset and adding one. A mux then selects one of the no-carryout and carryout signals as a second portion of the consecutive clear bits count in accordance with the carryout selector signal.

20 Claims, 3 Drawing Sheets

| rs1<4> | rs1<3> | rs1<2> | rs1<1> | rs1<0> | naz | lzc<1:0> |
|---|---|---|---|---|---|---|
| X | 0 | 0 | 0 | 0 | 1 | XX |
| X | 0 | 0 | 0 | 1 | 0 | 11 |
| X | 0 | 0 | 1 | X | 0 | 10 |
| X | 0 | 1 | X | X | 0 | 01 |
| 0 | 1 | X | X | X | 0 | 00 |

US 6,477,552 B1

DEVICE AND METHOD FOR PERFORMING A LEADING ZERO DETERMINATION ON AN OPERAND

TECHNICAL FIELD OF THE INVENTION

This invention relates in general to microprocessors and, more specifically, to devices and methods for performing a leading zero calculation with an offset, such as is done in executing a count-consecutive-clear-bits graphics instruction.

BACKGROUND OF THE INVENTION

As shown in FIG. 1, a conventional device 10 for executing a count-consecutive-clear-bits (cccb) graphics instruction (typically part of a shift operation) includes a leading zero determiner 12 that calculates the number of leading zeros nza in an operand stored in a register rs1. An offset stored in another register rs2is then subtracted from the number of leading zeros nza using an inverter 14 and an adder 16 to arrive at the consecutive clear bits count.

Although the device 10 executes the count-consecutive-clear-bits graphics instruction adequately, the serial nature of the calculation (i.e., determining the number of leading zeros nza, then determining the consecutive clear bits count cccb) makes it slower than desirable.

Accordingly, there is a need in the art for an improved device and method for performing a leading zero calculation with an offset.

SUMMARY OF THE INVENTION

In accordance with this invention, an improved device for performing a consecutive clear bits count on an operand with an offset includes a plurality of logic circuits, each associated with a prioritized portion of the operand. Each logic circuit activates an all-zero signal when its respective portion of the operand consists of all zeros, performs a leading zero count on its respective portion of the operand, and generates a leading zero signal by offsetting its leading zero count with a first portion of the offset. Also, a priority encoder generates a signal encoding the priority of the highest priority inactive all-zero signal, and selecting circuitry selects first and second portions of the leading zero signal associated with the highest priority inactive all-zero signal as a first portion of the consecutive clear bits count and a carryout selector signal, respectively, in accordance with the priority encoded signal.

Further, generating circuitry generates a no-carryout signal by offsetting the priority encoded signal with a second portion of the offset, generates a carryout signal by offsetting the priority encoded signal with the second portion of the offset and adding one, and selects one of the no-carryout and carryout signals as a second portion of the consecutive clear bits count in accordance with the carryout selector signal.

In other embodiments of this invention, the device described above is incorporated into a processor device, such as a Java processor, and an electronic system.

In a further embodiment, a consecutive clear bits count is performed on an operand with an offset. Specifically, for each of a plurality of prioritized portions of the operand, an all-zero signal is activated when the prioritized portion consists of all zeros, the number of leading zeros in the prioritized portion is counted, and a leading zero signal is generated by offsetting the prioritized portion's leading zero count with a first portion of the offset. Also, a signal encoding the priority of the highest priority inactive all-zero signal is generated, and first and second portions of the leading zero signal associated with the highest priority inactive all-zero signal are selected as a first portion of the consecutive clear bits count and a carryout selector signal, respectively, in accordance with the priority encoded signal. Further, a no-carryout signal is generated by offsetting the priority encoded signal with a second portion of the offset, and a carryout signal is generated by offsetting the priority encoded signal with the second portion of the offset and adding one. Then, one of the no-carryout and carryout signals is selected as a second portion of the consecutive clear bits count in accordance with the carryout selector signal.

DETAILED DESCRIPTION OF THE ILLUSTRATED EMBODIMENTS

Figure 2:
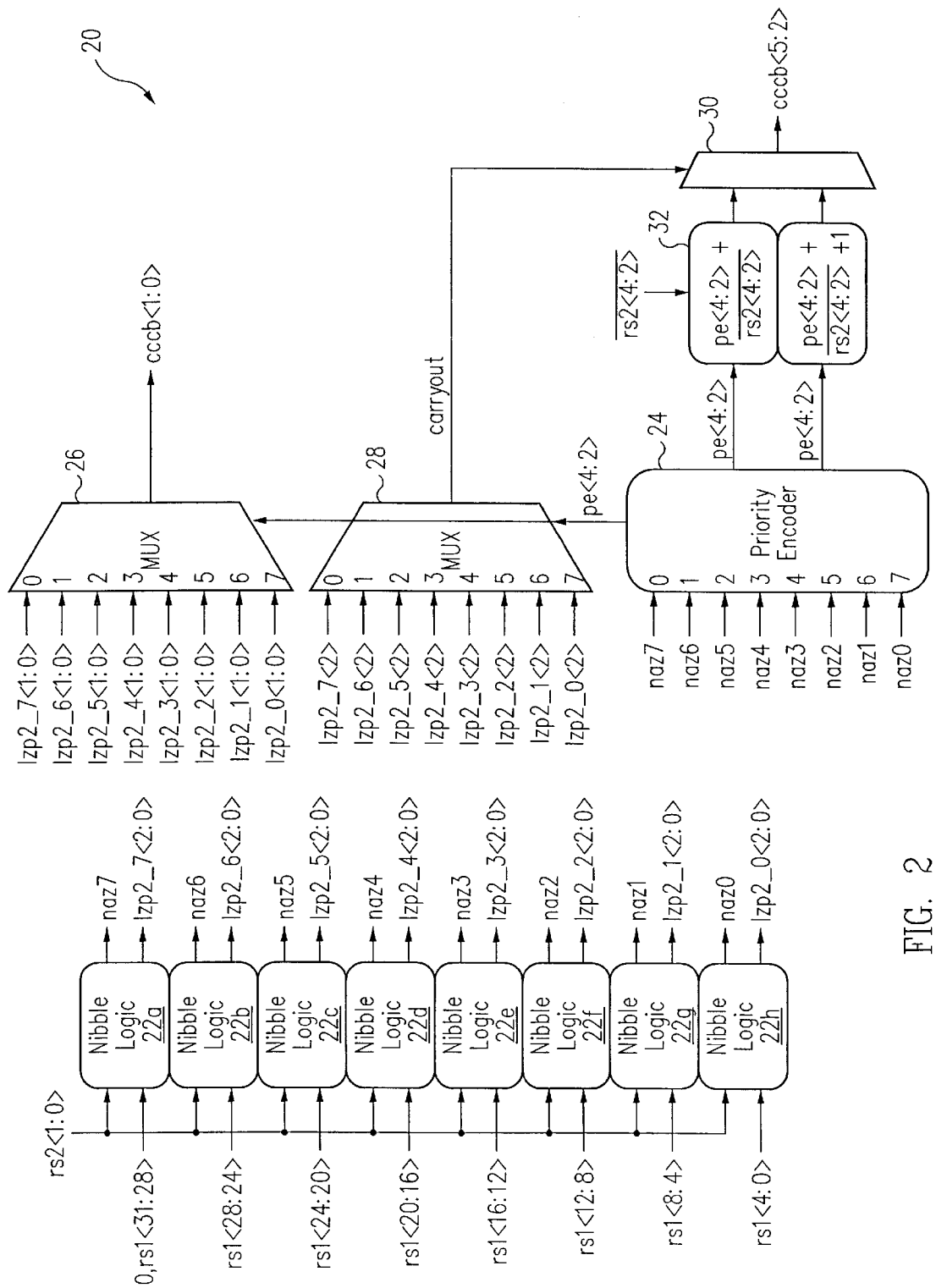
FIG. 2 is a block diagram illustrating a device for performing a leading zero determination in accordance with this invention.

As shown in FIG. 2, an improved device 20 for executing a count-consecutive-clear-bits graphics instruction includes nibble logic circuits 22a–h, each of which receives the lower two bits of a 5-bit offset value rs2 and a 4-bit nibble from a 32-bit operand rs1. In the case of the nibble logic circuits 22b–h, each also receives the lowest bit from the adjacent next most significant rs1nibble. Also, in the case of the nibble logic circuit 22a, since there is no next most significant rs1 nibble, it receives a zero bit in addition to its respective rs1 nibble.

It will be understood by those having skill in the technical field of this invention that the invention is applicable to leading zero calculations involving instructions other than a count-consecutive-clear-bits instruction, and that the offset value rs2 and operand rs1 are not limited to any particular bit length.

The nibble logic circuits 22a–h output 1-bit nibble all zero signals naz0–7 that indicate, for each circuit 22a–h, whether that circuit's associated rs1 nibble is all zero or not. In addition, the nibble logic circuits 22a–houtput 3-bit leading zero signals lzp2_0–7 that indicate, for each circuit 22a–h, an offset position within that circuit's associated rs1 nibble determined in accordance with the number of leading zeros in the associated rs1 nibble and the offset value rs2<1:0>. The nibble logic circuits 22a–h will be explained in more detail below with respect to FIGS. 3 and 4.

The nibble all zero signals naz0–7 are encoded in a priority encoder 24 in reverse order in accordance with the following table (whereφ=don't care and pe is a priority encoded signal):

TABLE 1

| naz7 | naz6 | naz5 | naz4 | naz3 | naz2 | naz1 | naz0 | pe |
|------|------|------|------|------|------|------|------|-----|
| 1 | 1 | 1 | 1 | 1 | 1 | 1 | 0 | 111 |
| 1 | 1 | 1 | 1 | 1 | 1 | 0 | φ | 110 |
| 1 | 1 | 1 | 1 | 1 | 0 | φ | φ | 101 |
| 1 | 1 | 1 | 1 | 0 | φ | φ | φ | 100 |
| 1 | 1 | 1 | 0 | φ | φ | φ | φ | 011 |
| 1 | 1 | 0 | φ | φ | φ | φ | φ | 010 |
| 1 | 0 | φ | φ | φ | φ | φ | φ | 001 |
| 0 | φ | φ | φ | φ | φ | φ | φ | 000 |

A first mux 26 then selects and outputs the lowest two bits of the leading zero signal lzp2_* that corresponds to the inactive nibble all zero signal naz* as the lowest two bits of the consecutive clear bits count cccb. In addition, a second mux 28 selects and outputs the highest bit of the leading zero signal lzp2_* that corresponds to the active nibble all zero signal naz* as a carryout signal. The carryout signal then causes a third mux 30 to select either (i) the output from an adder 32 that adds the priority encoded signal pe and the inverse of the upper three bits of the offset value rs2, or (ii) the output from another adder 34 that adds the priority encoded signal pe, the inverse of the upper three bits of the offset value rs2, and [001], as the upper three bits of the consecutive clear bits count cccb.

Figure 1:
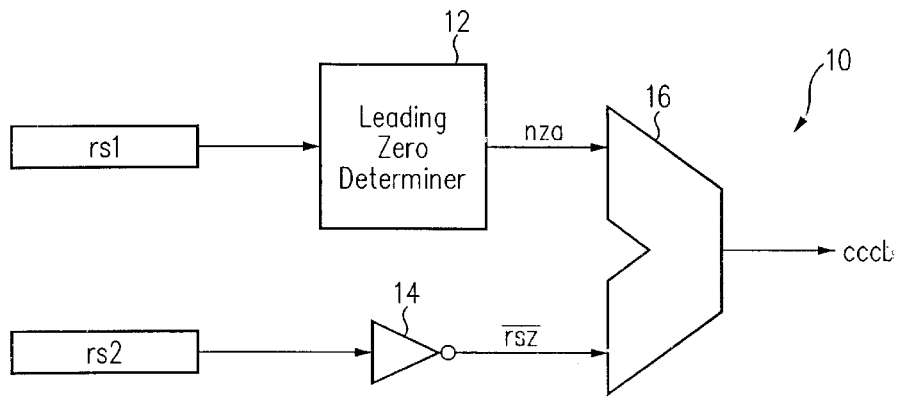
FIG. 1 is a block diagram illustrating a conventional device for performing a leading zero determination.
Figure 3:
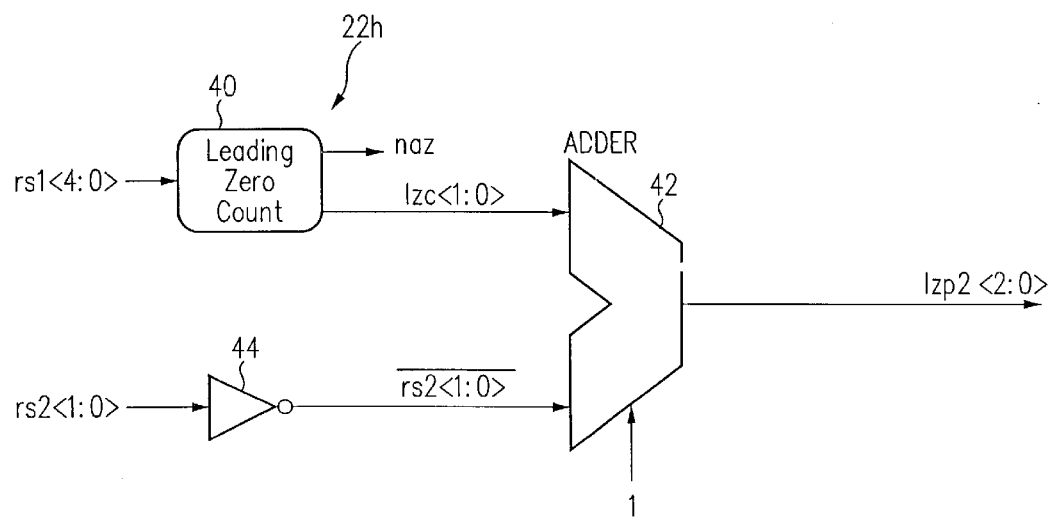
FIG. 3 is a block diagram showing nibble logic of the device of FIG. 2 in more detail.

As shown in FIG. 3, the nibble logic circuit 22h includes a leading zero count circuit 40 that receives a portion of the operand rs1 and generates a corresponding nibble all zero signal naz and leading zero count signal lzc. The nibble logic circuit 22h also includes an adder 42 and inverter 44 that add the leading zero count signal lzc, the inverse of the lowest two bits of the offset value rs2, and [01] together to generate the leading zero signal lzp2. The table shown in FIG. 4 illustrates the operation of the leading zero count circuit 40 of FIG. 3 (where "X" is a don't care).

By determining the leading zero count in the operand rs1 and, at the same time, subtracting the offset value rs2 from the operand rs1, this invention provides a device for determining a leading zero count with an offset with improved speed over the conventional device previously described.

Figures 4, 5:
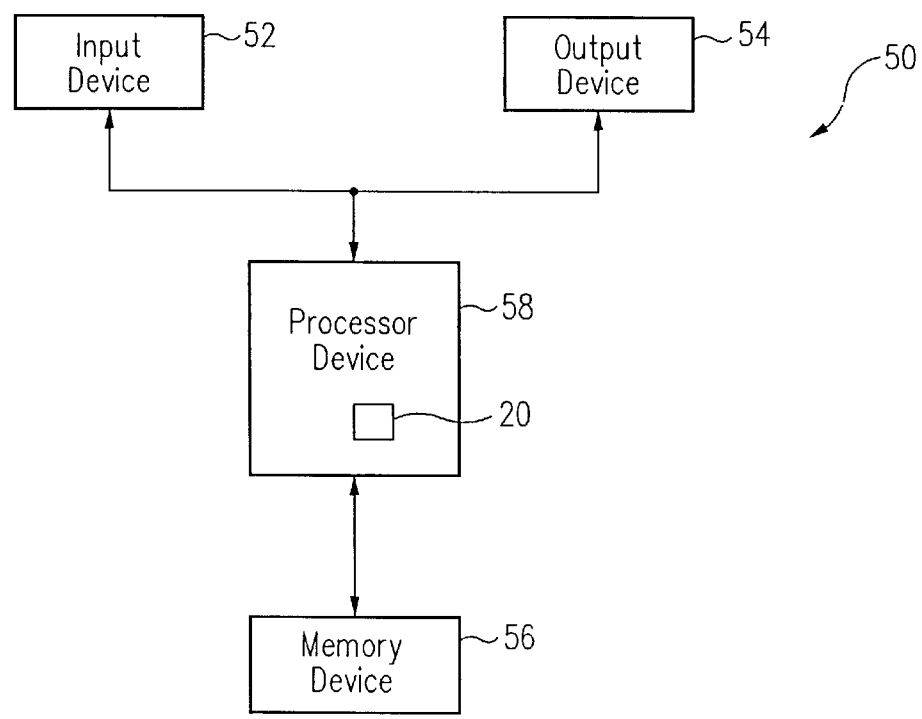
FIG. 4 is a table showing the outputs of leading zero count circuitry of the nibble logic of FIG. 3.
FIG. 5 is a block diagram showing an electronic system including a processor device that incorporates the device of FIG. 2.

As shown in FIG. 5, an electronic system 50 in accordance with this invention includes an input device 52, an output device 54, a memory device 56, and a processor device 58 that incorporates the device 20 of FIG. 2. It will be understood that the processor device 58 may be, for example, a Java processor, or may be any other processor that performs leading zero determinations on operands.

Although this invention has been described with reference to particular embodiments, the invention is not limited to these described embodiments. Rather, the invention is limited only by the appended claims, which include within their scope all equivalent devices and methods that operate according to the principles of the invention as described.

What is claimed is:

1. A device for performing a consecutive clear bits count on an operand with an offset, the device comprising:
   a plurality of logic circuits, each associated with a prioritized portion of the operand, and each for activating an all-zero signal when its respective portion of the operand consists of all zeros, for performing a leading zero count on its respective portion of the operand, and for generating a leading zero signal by offsetting its leading zero count with a first portion of the offset;
   a priority encoder coupled to the logic circuits for generating a signal encoding the priority of the highest priority inactive all-zero signal;
   circuitry coupled to the priority encoder for selecting first and second portions of the leading zero signal associated with the highest priority inactive all-zero signal as a first portion of the consecutive clear bits count and a carryout selector signal, respectively, in accordance with the priority encoded signal; and
   circuitry coupled to the priority encoder and the selecting circuitry for generating a no-carryout signal by offsetting the priority encoded signal with a second portion of the offset, for generating a carryout signal by offsetting the priority encoded signal with the second portion of the offset and adding one, and for selecting one of the no-carryout and carryout signals as a second portion of the consecutive clear bits count in accordance with the carryout selector signal.

2. The device of claim 1, wherein each logic circuit is associated with a nibble-sized portion of the operand.

3. The device of claim 1, wherein each logic circuit comprises leading zero count circuitry, an inverter, and an adder.

4. The device of claim 1, wherein the highest priority portion of the operand has highest priority.

5. The device of claim 1, wherein the selecting circuitry comprises at least one mux.

6. The device of claim 1, wherein the operand is a 32-bit operand, the first portion of the offset is 2-bit portion, the first portion of the leading zero signal is a 2-bit portion, the second portion of the leading zero signal is a 1-bit portion, the first portion of the consecutive clear bits count is a 2-bit portion, the carryout selector signal is a 1-bit signal, the priority encoded signal is a 3-bit signal, the second portion of the offset is a 3-bit portion, and the second portion of the consecutive clear bits count is a 3-bit portion.

7. The device of claim 1, wherein the generating circuitry comprises at least two adders and a mux.

8. A processor device comprising:
   a first register storing an operand;
   a second register storing an offset; and
   a device coupled to the first and second registers for performing a consecutive clear bits count on the operand with the offset, the device comprising:
      a plurality of logic circuits, each associated with a prioritized portion of the operand, and each for activating an all-zero signal when its respective portion of the operand consists of all zeros, for performing a leading zero count on its respective portion of the operand, and for generating a leading zero signal by offsetting its leading zero count with a first portion of the offset;
      a priority encoder coupled to the logic circuits for generating a signal encoding the priority of the highest priority inactive all-zero signal;
      circuitry coupled to the priority encoder for selecting first and second portions of the leading zero signal associated with the highest priority inactive all-zero signal as a first portion of the consecutive clear bits count and a carryout selector signal, respectively, in accordance with the priority encoded signal; and
      circuitry coupled to the priority encoder and the selecting circuitry for generating a no-carryout signal by offsetting the priority encoded signal with a second portion of the offset, for generating a carryout signal by offsetting the priority encoded signal with the second portion of the offset and adding one, and for selecting one of the no-carryout and carryout signals as a second portion of the consecutive clear bits count in accordance with the carryout selector signal.

9. The processor device of claim 8, wherein the processor device comprises a Java processor.

10. An electronic system comprising an input device, an output device, a memory device, and a processor device coupled to the input, output, and memory devices, the processor device comprising:

a first register storing an operand;

a second register storing an offset; and a device coupled to the first and second registers for performing a consecutive clear bits count on the operand with the offset, the device comprising:

a plurality of logic circuits, each associated with a prioritized portion of the operand, and each for activating an all-zero signal when its respective portion of the operand consists of all zeros, for performing a leading zero count on its respective portion of the operand, and for generating a leading zero signal by offsetting its leading zero count with a first portion of the offset;

a priority encoder coupled to the logic circuits for generating a signal encoding the priority of the highest priority inactive all-zero signal;

circuitry coupled to the priority encoder for selecting first and second portions of the leading zero signal associated with the highest priority inactive all-zero signal as a first portion of the consecutive clear bits count and a carryout selector signal, respectively, in accordance with the priority encoded signal; and circuitry coupled to the priority encoder and the selecting circuitry for generating a no-carryout signal by offsetting the priority encoded signal with a second portion of the offset, for generating a carryout signal by offsetting the priority encoded signal with the second portion of the offset and adding one, and for selecting one of the no-carryout and carryout signals as a second portion of the consecutive clear bits count in accordance with the carryout selector signal.

11. The electronic system of claim 10, wherein each logic circuit of the processor device is associated with a nibble-sized portion of the operand.

12. The electronic system of claim 10, wherein each logic circuit of the processor device comprises leading zero count circuitry, an inverter, and an adder.

13. The electronic system of claim 10, wherein the highest priority portion of the operand has highest priority.

14. A method for performing a consecutive clear bits count on an operand with an offset, the method comprising:

for each of a plurality of prioritized portions of the operand, activating an all-zero signal when the prioritized portion consists of all zeros;

counting the number of leading zeros in the prioritized portion; and generating a leading zero signal by offsetting the prioritized portion's leading zero count with a first portion of the offset;

generating a signal encoding the priority of the highest priority inactive all- zero signal;

selecting first and second portions of the leading zero signal associated with the highest priority active all-zero signal as a first portion of the consecutive clear bits count and a carryout selector signal, respectively, in accordance with the priority encoded signal;

generating a no-carryout signal by offsetting the priority encoded signal with a second portion of the offset;

generating a carryout signal by offsetting the priority encoded signal with the second portion of the offset and adding one; and selecting one of the no-carryout and carryout signals as a second portion of the consecutive clear bits count in accordance with the carryout selector signal.

15. The method of claim 14, wherein the act of counting the number of leading zeros includes counting the number of leading zeros using leading zero count circuitry.

16. The method of claim 14, wherein the act of generating the priority encoded signal includes generating the priority encoded signal using a priority encoder.

17. The method of claim 14, wherein the act of selecting first and second portions of the leading zero signal includes selecting the first and second portions using a plurality of muxes.

18. The method of claim 14, wherein the act of generating the no-carryout signal includes generating the no-carryout signal using an adder.

19. The method of claim 14, wherein the act of generating the carryout signal includes generating the carryout signal using an adder.

20. The method of claim 14, wherein the act of selecting one of the no-carryout and carryout signals includes selecting one of these signals using a mux.

* * * * *